United States Patent
Uchiyama

[11] Patent Number: 5,831,231
[45] Date of Patent: Nov. 3, 1998

[54] LEVER SWITCH APPARATUS

[75] Inventor: Norio Uchiyama, Tokyo, Japan

[73] Assignee: Niles Parts Co., Ltd, Japan

[21] Appl. No.: 936,834

[22] Filed: Sep. 25, 1997

[30] Foreign Application Priority Data

Sep. 26, 1996 [JP] Japan ..................................... 8-273934

[51] Int. Cl.$^6$ .................................................. H01H 25/00
[52] U.S. Cl. ..................................... 200/61.54; 200/61.27; 200/332
[58] Field of Search .............................. 200/4, 6 A, 17 R, 200/61.27–61.35, 61.54, 332, 335

[56] References Cited

U.S. PATENT DOCUMENTS

| | | | |
|---|---|---|---|
| 4,137,438 | 1/1979 | Sato et al. | 20/153 H |
| 4,393,280 | 7/1983 | Iwata et al. | 200/4 |
| 4,942,273 | 7/1990 | Furuhashi et al. | 200/61.54 |
| 5,661,276 | 8/1997 | Shibata | 200/61.54 |
| 5,672,855 | 9/1997 | Uchiyama et al. | 200/61.3 |

*Primary Examiner*—Michael A. Friedhofer
*Attorney, Agent, or Firm*—Rader, Fishman & Grauer

[57] ABSTRACT

A lever switch apparatus having a movable board adapted to be unchanged by the operating position in a second direction of an operating lever, even where the movable board is modified by designing. The apparatus is provided with a lever (2) and a movable board (3A). The lever (2) is arranged to be swingable respectively about first and second axes (21, 22) in first and second directions, and has an engager (23) at a tip thereof. The movable board (3A) is arranged to be swingable about a third axis in a third direction, and has an elongate hole (32A) and a movable contact piece (33A) mounted thereon. The engager (23) is engaged with the wall surface (34A) of the elongate hole (32A) The inclination angle of the wall surface is varied as the third axis is approached.

8 Claims, 6 Drawing Sheets

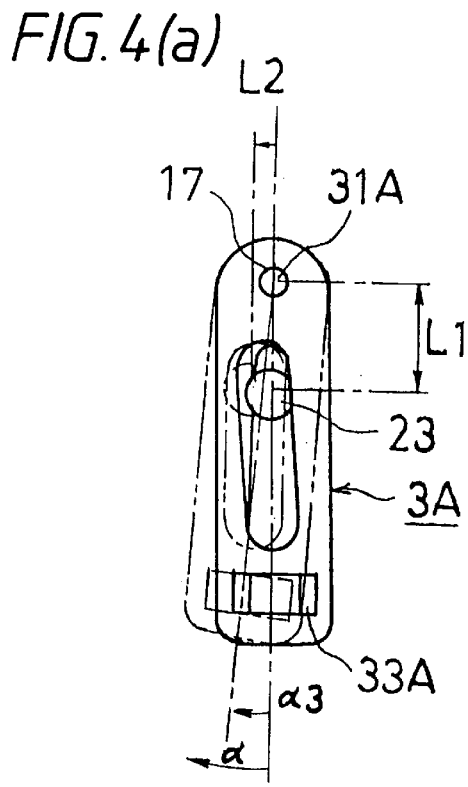
FIG. 4(a)
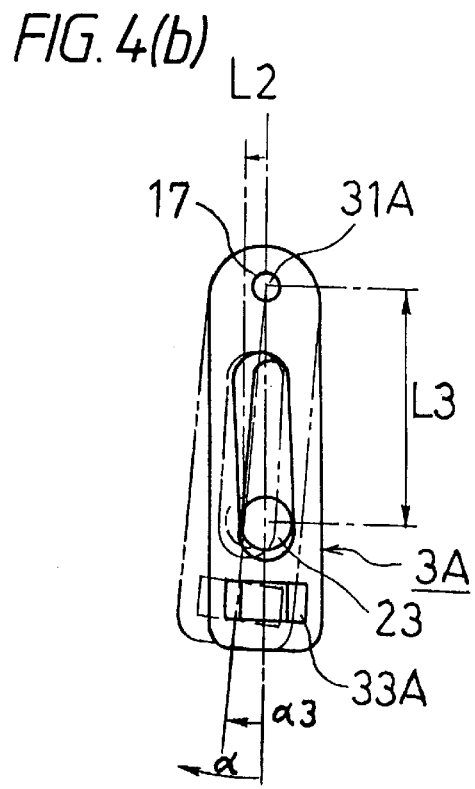
FIG. 4(b)
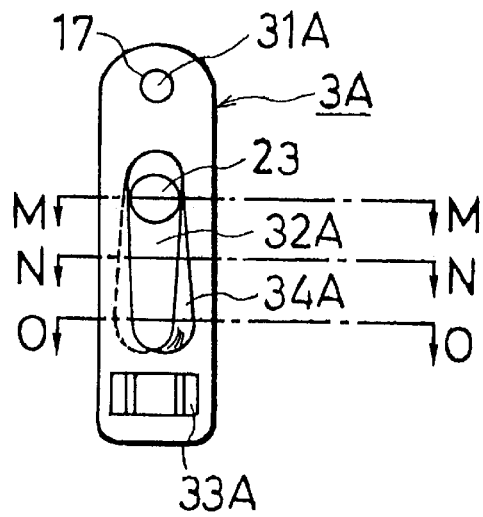
FIG. 5(a)
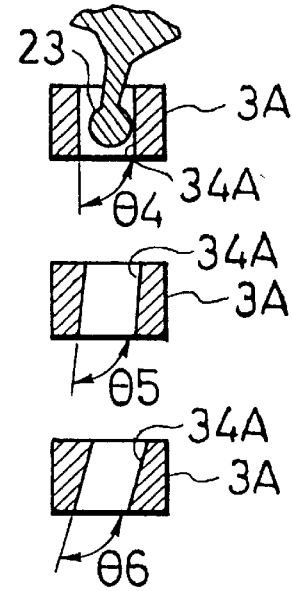
FIG. 5(b)
FIG. 5(c)
FIG. 5(d)

LEVER SWITCH APPARATUS

BACKGROUND OF THE INVENTION

1. Field of the Invention

The present invention relates generally to switches for automotive vehicles and, in particular, to an improvement of a lever switch apparatus for use in a combination switch or the like arranged to control respective loads on a lighting system, a wiper system, and a turn signal system for automotive vehicles.

2. Description of the Related Art

A conventional lever switch apparatus is shown in FIGS. 6 to 8 of the accompanying drawings The conventional apparatus has a lever 2 held by a switch main body 1. The lever 2 has an engager 23 at a tip so as to be swung respectively in a first direction and a second direction about a first axis 21 and a second axis 22. A movable board 3 is supported by fitting a third axis 31 on a support pole 17 so as to be swung in a third direction about a third axis 31. The board 3 has an elongate hole 32 extending in the second direction and a movable contact piece 33. The movable board 3 is interlocked with the lever 2 by engaging the engager 23 with a wall surface 34 of the elongate hole 32.

More specifically, the lever 2 is swingable in the first direction by fitting its first axis 21 in a lever support body 24. The lever support body 24 is formed at an inner surface with a cam 27 with which a steel ball 25 provided on the lever 2 is press-contacted by a spring 26. Thus, the lever 2 is given a nodal feeling upon being operated in the first direction. The lever support body 24 has a second axis 22 formed in an outer surface thereof to be fitted in a cover 11 of the switch main body 1 so that the lever 2 and the lever support body 24 are swingable in one body in the second direction.

The cover 11 is elastically fitted on the case 12 of the switch main body 1 so that the lever support body 24 together with the lever 2 is held by the switch main body 1. The case 12 incorporates the movable board 3, a first movable contact 13, and a second movable contact 14 arranged for switching over. The movable contacts 13, 14 are to be connected to and disconnected from a fixed contact (not shown) provided at an inner surface 16 of the polarity board 15 elastically fitted in the case 12. The movable board 3 is engaged with the engager 23 of the lever 2. The first movable contact 13 is engaged with a first manipulator 28 provided at a lower end of the lever support body 24. Furthermore, the second movable contact 14 is engaged with a second manipulator 29 that is operable by a rotation knob (not shown) of the lever 2.

In the conventional lever switch apparatus thus constructed, the operation of the lever 2 in the first direction causes interaction of the movable board 3 therewith for being swung so that the movable contact piece 33 slides over the fixed contact of the polarity board 15 thereby performing switching over. For example, if the lever 2 is operated to rotate against a nodal force due to the cam 27 from a position shown by a solid line A in FIG. 6 to a position shown by a hypothetical line B, the engager 23 is rotated about a first axis 21 from a position shown by a solid line C to a position shown by a hypothetical line D. As a result, the movable board 3 is forced by the engager 23 to slide from a position shown by a solid line E to a position shown by a hypothetical line F.

In the conventional apparatus, however, there is a difference of swing angle a in the movable board 3 in relation to the distance from the third axis 31 to the engager 23, between where the lever 2 is operated in the first direction from a position shown by a solid line G, and where it is operated in the first direction from a position shown by a hypothetical line H. As a result, there arises a difference in the amount of movement of the movable contact piece 33 provided on the movable board 3.

For example, as shown in FIG. 8(a), if the engager 23 is displaced by a distance L2 by operating the lever 2 in the first direction from a state that the distance from the third axis 31 to the engager 23 is a minimum distance L1, the movable board 3 is swung by an angle α1. As shown in FIG. 8(b), if the engager 23 is displaced by the same distance L2 by operating the lever 2 in the first direction from a state that the distance from the third axis 31 to the engager 23 is a maximum distance L3, the movable board 3 is swung by an angle α2.

In this manner, the conventional lever switch apparatus has the swing angle a in the movable board 3 that is largely different depending on the operating position in the second direction. As a result, there arises a difference in moving amount of the movable contact piece 33 provided on the movable board 3, thus posing a problem that the switch-over position between the movable contact piece 33 and the polarity board 15 is varied. This makes the design of the structure of the fixed contact difficult and prone to malfunctions.

SUMMARY OF THE INVENTION

An object of the present invention is to provide a lever switch apparatus that solves the problems with the conventional lever switch apparatus described above.

More specifically, an object of the present invention is to eliminate the above-stated problem of the conventional lever switch apparatus by modifying the design of a conventional movable board.

It is a further object of the present invention to provide a lever switch apparatus which has no difference in the swing angle in a movable board due to operating position of a lever in a second direction to thereby make constant the moving amount in a movable contact piece provided on the movable board and, hence, the switch-over position between the movable contact piece and the polarity board and the fixed electrode.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch apparatus is provided comprising: a lever supported by a switch main body, arranged to be swingable respectively about a first axis and a second axis in a first direction and a second direction, and having an engager at a tip thereof; a movable board supported by the switch main body, arranged to be swingable about a third axis in a third direction, and having an elongate hole and a movable contact piece; wherein the movable board is interlocked to the lever by engaging the engager with a wall surface of the elongate hole; the wall surface has a inclination angle varied depending on a distance from the third axis.

The invention further provides a lever switch apparatus, wherein the inclination angle in a wall surface decreases as the third axis is approached. The wall surface is preferably given an acute angle at a closest position to the third axis.

The invention further provides a lever switch apparatus, wherein the inclination angle in the wall surface is given an obtuse angle at a farthest position from the third axis.

BRIEF DESCRIPTION OF THE DRRWINGS

The present invention will become more clearly appreciated as the disclosure of the invention is made with reference to the accompanying drawings. In the drawings:

FIG. 1 is a sectional view showing a preferred embodiment of a lever switch apparatus according to the present invention;

FIGS. 2(a) to 2(d) are views showing an essential part of the structure shown in FIG. 1, wherein FIG. 2(a) is a bottom view, and FIGS. 2(b), 2(c) and 2(d), respectively, are sectional views taken on lines I—I, J—J and K—K in FIG. 2(a);

FIG. 3 is an essential-part exploded perspective view of a lever and a movable board of the lever switch apparatus shown in FIG. 1;

FIGS. 4(a) and 4(b) are views for explaining the operation of the structure shown in FIG. 1, wherein FIGS. 4(a) and 4(b), respectively, show the operations when the distance from a third axis to an engager is L1 and L2;

FIGS. 5(a) to 5(d) are views showing an essential part of the preferred embodiment of the present invention, wherein FIG. 5(a) is a bottom view, and FIGS. 5(b), 5(c) and 5(d), respectively, are sectional views taken on lines M—M, N—N and O—O in FIG. 5(a);

Figure 6:
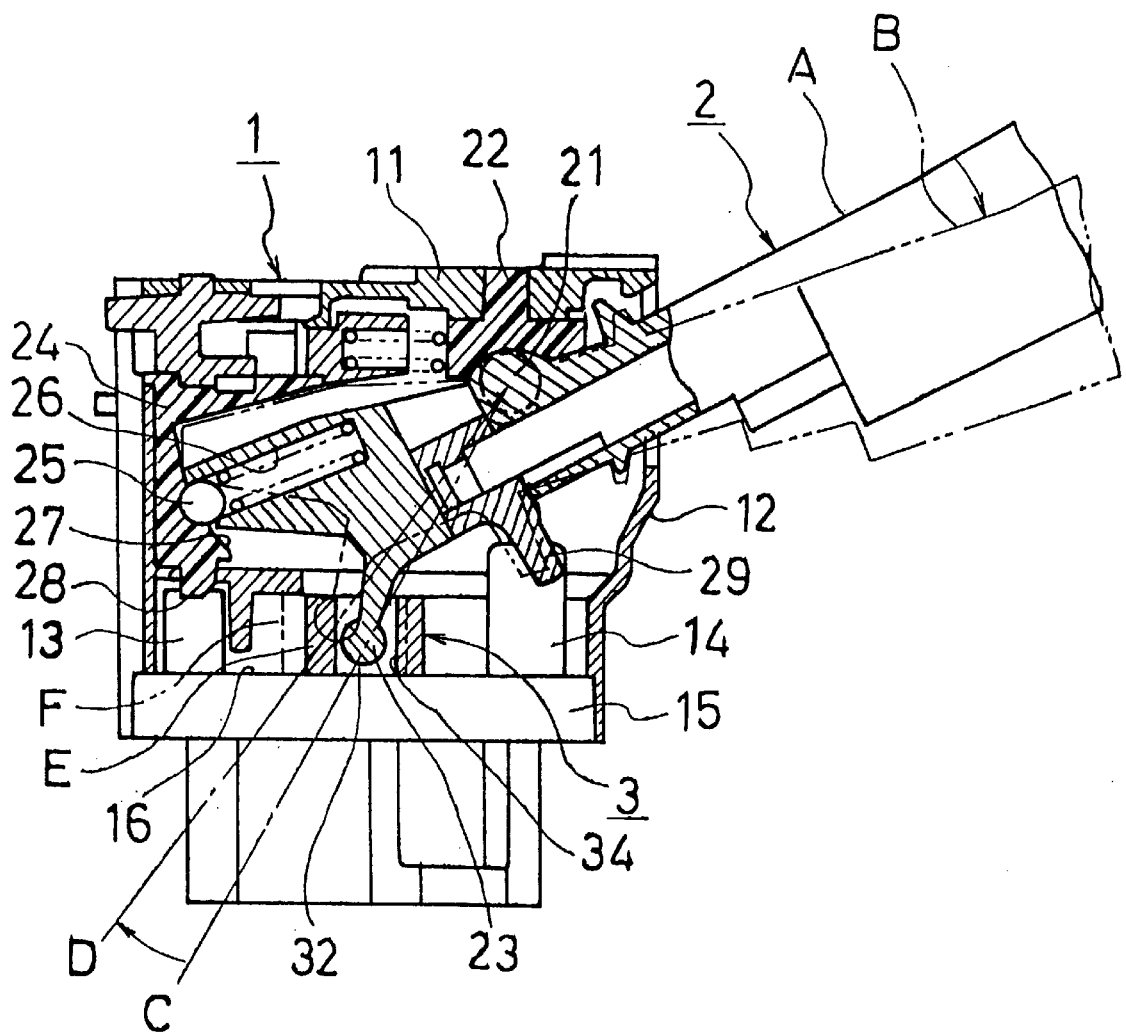
FIG. 6 is sectional view showing a conventional lever switch apparatus.
Figure 8A:
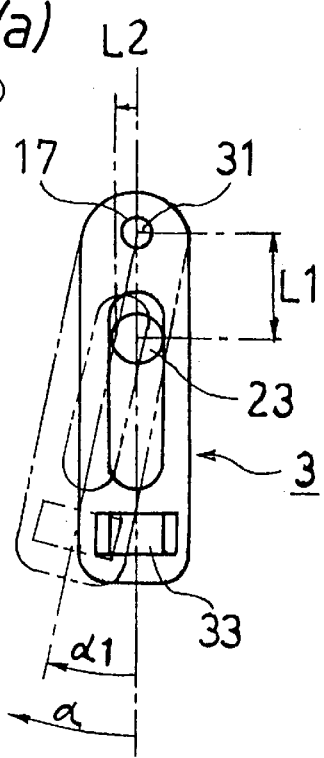
Figure 8B:
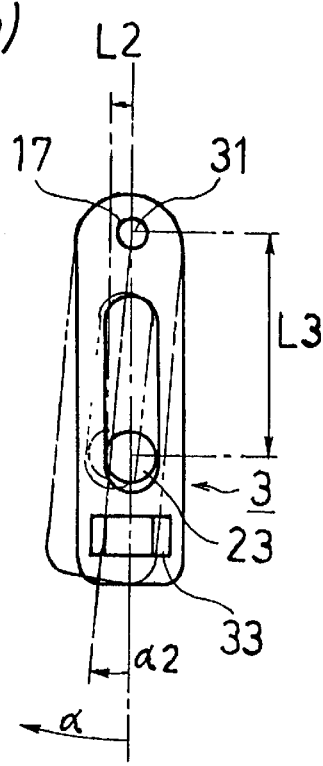

FIGS. 8(a) and 8(b) are views for explaining the operation of the structure shown in FIG. 6, wherein FIGS. 8(a) and 8(b), respectively, show the operations when the distance from a third axis to an engager is L1 and L3.

DETAILED DESCRIPTION OF THE PREFERRED EMBODIMENT

A preferred embodiment of a lever switch apparatus according to the present invention will now be described in detail with reference to FIGS. 1 to 5 of the accompanying drawings.

Figure 7:
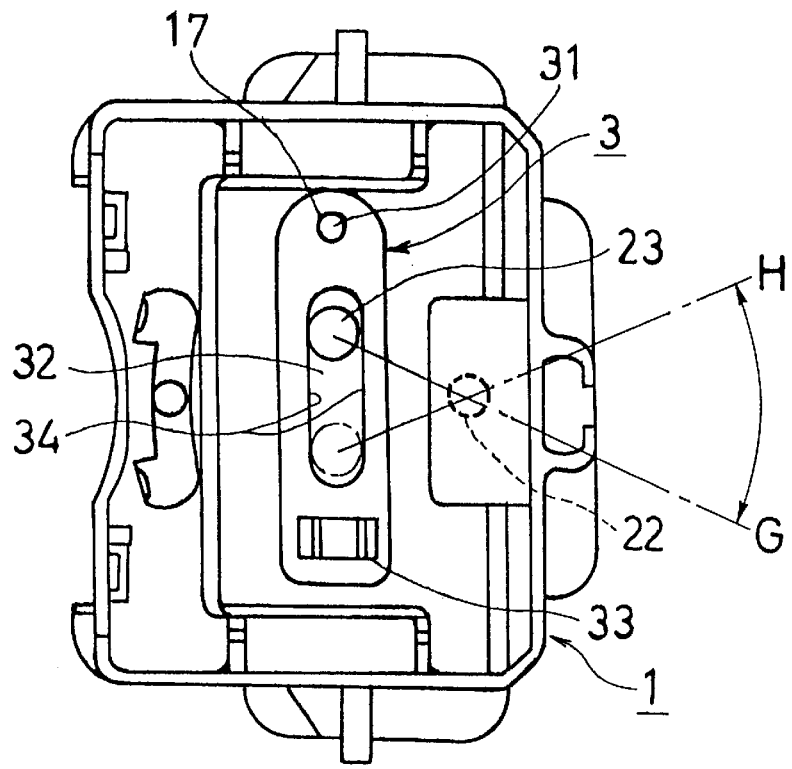
FIG. 7 is a bottom view of the structure shown in FIG. 6.

In FIGS. 1 to 5, the structure is the same as that of the conventional apparatus shown in FIGS. 6 to 8, except for the movable board 3A. Thus, the same structural parts shown in the figures are denoted by the same reference characters and a further explanation thereof is omitted.

Figure 1:
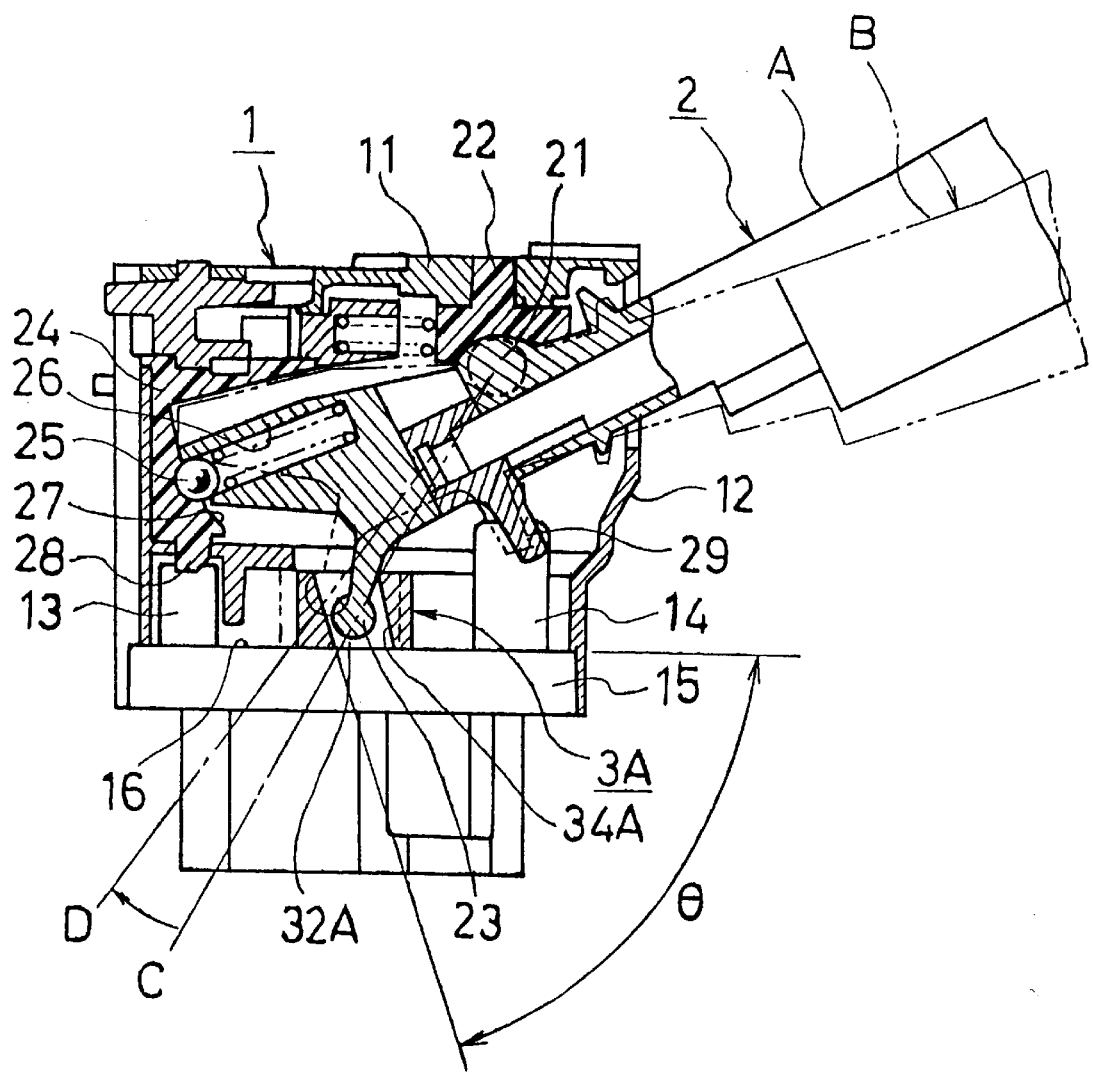
Figure 2A:
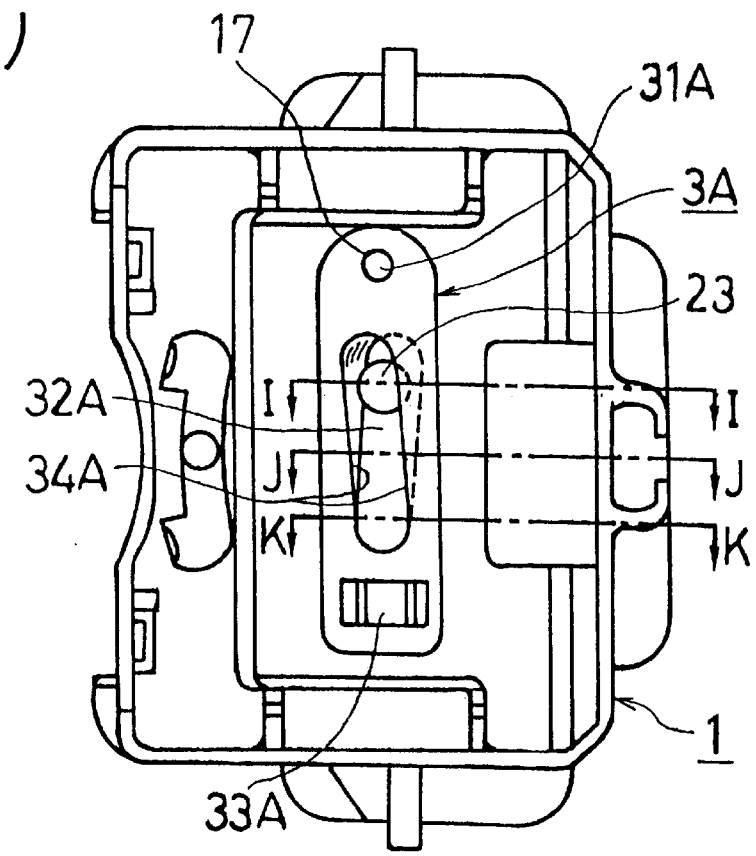
Figure 2B:
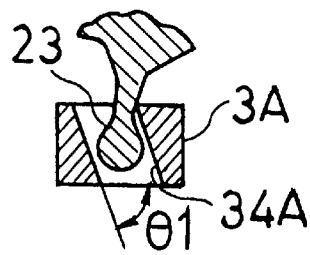
Figure 2C:
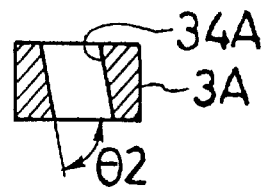
Figure 2D:
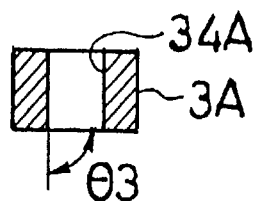
Figure 3:
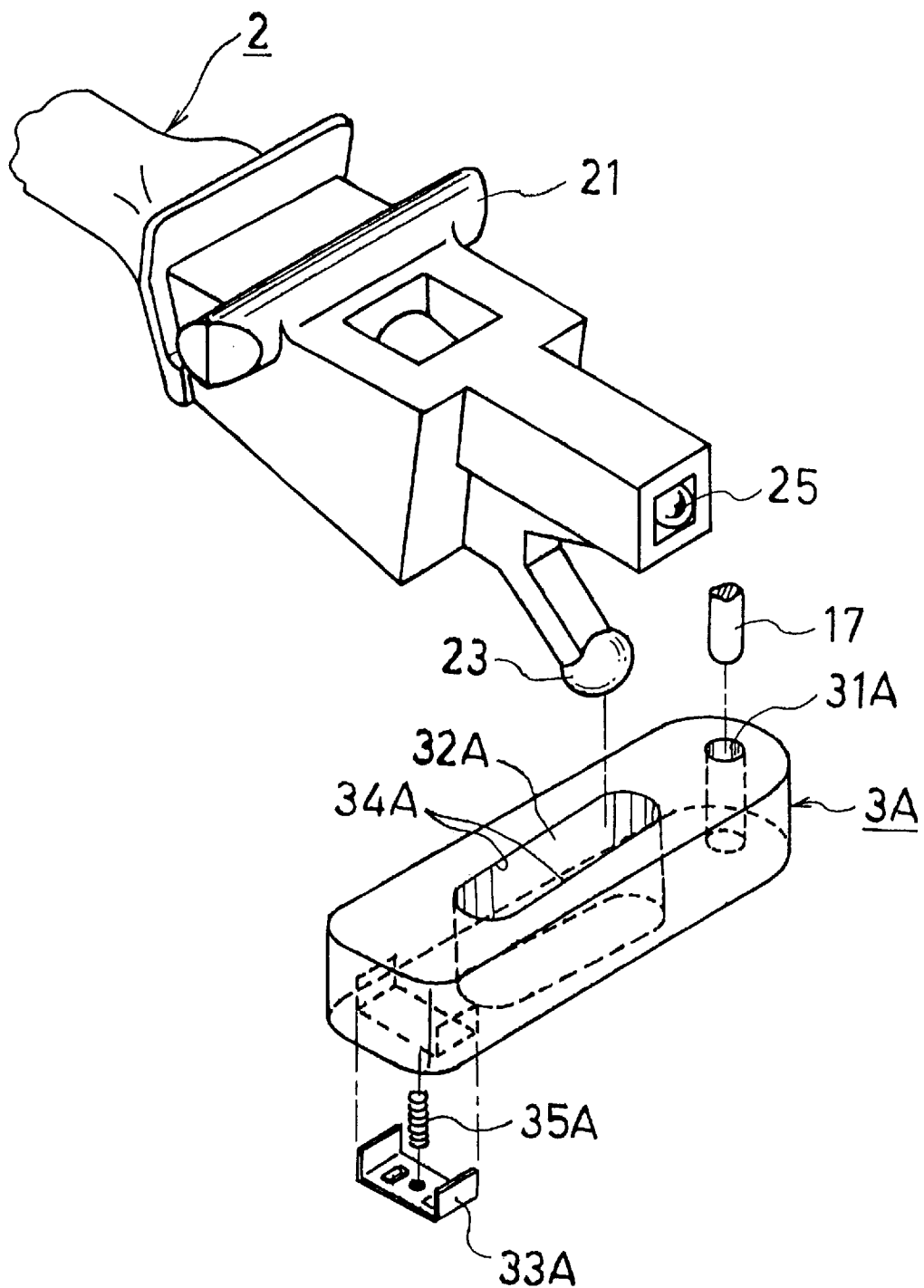

The movable board 3A is supported by fitting a third axis 31A thereof on a support pole 17 formed in a switch main body 1 so that it is swingable in a third direction about a third axis 3A, similarly to the conventional movable board 3. The movable board 3A is provided with an elongate hole 32A extending in a second direction and a movable contact piece 33A. The elongate hole 32A has an inclination angle $\theta$ in a wall surface thereof that is provided to decrease as the third axis 31A is approached. For example, the inclination angle $\theta$ is set to an acute angle $\theta 1$, as shown in FIG. 2(b) in a section viewed from the arrow I—I in FIG. 2(a), to an angle $\theta 2$ that is a greater angle than the angle $\theta 1$, as shown in FIG. 2(c) in a section viewed from the arrow J—J in FIG. 2 (a), and to an angle $\theta 3$ that is generally in a right angle as shown in FIG. 2(d) in a section viewed from the arrow K—K in FIG. 2(a).

In the lever switch apparatus thus structured, when the lever 2 is operated from a position shown by a solid line A to a position shown by a hypothetical line B, an engager 23 is displaced about a first axis 21 from a position shown by a solid line C to a position shown by a hypothetical line D. As a result, the movable board 3A is forced by the engager 23 to swing in a manner similar to the conventional art. This causes the movable piece 33A that is urged toward a polarity board 15 by a spring 35A to slide over a fixed contact on the polarity board 15, thus achieving switching over.

At this time, the inclination angle $\theta$ in the wall surface of the elongate hole 32A is reduced as the third axis 31A is approached. Accordingly, even if the engager 23 is displaced by a distance L2 due to operation of the lever 2 in the first direction from a state that the distance from the third axis 31A to the engager 23 is a minimum distance L1 as shown in FIG. 4(a) for example, and even if the engager 23 is displaced by the same distance L2 as the above state from a state that the distance from the third axis 31A to the engager 23 is a maximum distance L3 as shown in FIG. 4(b), the movable board 3A swings by a same angle $\alpha 3$. That is, the swing angle $\alpha$ in the movable board 3A is rendered almost constant regardless of the operating position of the lever 2 in the second direction. The amount of movement in the movable contact piece 33A on the movable board 3A also becomes constant. Therefore, the position in switch over between the movable piece 33A and the polarity board 15 is unchanged, and the freedom in designing an arrangement structure of the fixed contact is improved, thereby eliminating a fear of incurring malfunction.

Incidentally, the inclination angle $\theta$ in the wall surface 34A of the movable board 3A may be given of an obtuse angle at the farthest position from the third axis 31A. For example, in a section viewed from the arrow M—M in FIG. 5(a) the inclination angle may be set to a right angle $\theta 3$ as shown in FIG. 5(b); in a section viewed from a direction of an arrow M—M in FIG. 5(a) the inclination angle may be set to an angle $\theta 5$ that is greater than the above angle $\theta 4$ as shown in FIG. 5(c); and in a section viewed from a direction of the arrow O—O in FIG. 5(a) the inclination angle may be set to an angle $\theta 6$ greater than the above angle $\theta 4$. Also, the elongate hole 32A may be curved correspondingly to the path of movement in the engager 23 during swing of the lever 2 in the second direction. Other various modifications are also possible with the lever switch apparatus according to the present invention.

According to the present invention, a lever switch apparatus is provided which comprises: a lever supported by a switch main body, arranged to be swingable respectively about a first axis and a second axis in a first direction and a second direction, and having an engager at a tip thereof; a movable board supported by the switch main body, arranged to be swingable about a third axis in a third direction, and having an elongate hole and a movable contact piece; wherein the movable board is interlocked to the lever by engaging the engager with a wall surface of the elongate hole; and the wall surface having an inclination angle varied depending on the distance from the third axis. Accordingly, there is provided an effect that no difference occurs in the angle of swing of the movable board depending on the operating position of the lever in the second direction to thereby make constant the moving amount in the movable contact piece provided on the movable board and, hence, the switch-over position between the movable contact piece and the polarity board and the fixed electrode.

Also, in this invention, since the inclination angle in the wall surface decreases as the third axis is approached, there is provided another effect, in addition to the above effect, that the forming die structure for the movable board is rendered comparatively simple.

Further, in this invention, since the inclination angle in the wall surface is given of an acute angle at a closest position to the third axis, there is provided a further effect, in addition to the above effects, that the range of swing in the movable board cannot be largely varied by design modification from that of the conventional lever switch apparatus.

Still further in this invention, since the inclination angle in the wall surface is an obtuse angle at a farthest position from the third axis, there is provided another effect, in addition to the above effects, that the moving amount in the movable board can be greatly magnified relative to the swing angle in the engager.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch apparatus, comprising:

a lever (2) supported by a switch main body (1), arranged to be swingable respectively about a first axis (21) and a second axis (22) in a first direction and a second direction, and having an engager (23) at a tip thereof;

a movable board (3A) supported by the switch main body (1), arranged to be swingable about a third axis (31A) in a third direction, and having an elongate hole (32A) and a movable contact piece (33A);

wherein the movable board (3A) is interlocked to the lever (2) by engaging the engager (23) with a wall surface (34A) of the elongate hole (32A); and the wall surface (34A) has an inclination angle (θ) which varies depending on a distance from the third axis (31A).

2. The lever switch apparatus according to claim 1, wherein the inclination angle (θ) in the wall surface (34A) decreases as the third axis (31A) is approached.

3. The lever switch apparatus according to claim 2, wherein the inclination angle (θ) in the wall surface (34A) is an acute angle at a closest position to the third axis (31A).

4. The lever switch apparatus according to claim 3, wherein the inclination angle (θ) in the wall surface (34A) is an obtuse angle at a farthest position from the third axis (31A).

5. The lever switch apparatus according to claim 1, wherein the inclination angle (θ) in the wall surface (34A) is an acute angle at a closest position to the third axis (31A).

6. The lever switch apparatus according to claim 5, wherein the inclination angle (θ) in the wall surface (34A) is an obtuse angle at a farthest position from the third axis (31A).

7. The lever switch apparatus according to claim 1, wherein the inclination angle (θ) in the wall surface (34A) is an obtuse angle at a farthest position from the third axis (31A).

8. A lever switch apparatus for use in a combination switch for an automotive vehicle, comprising:

a lever (2) supported by a switch main body (1), said lever (2) being arranged to be swingable respectively about a first axis (21) and a second axis (22) in a first direction and a second direction, and having an engager (23) protruding from a tip of the lever (2);

a movable board (3A) supported by the switch main body (1), said movable board (3A) being arranged to be swingable about a third axis (31A) in a third direction, and having an elongate hole (32A) formed in said movable board (3A), and a movable contact piece (33A) secured on an opposite side of the elongate hole (32A) relative to said third axis (31A);

wherein the movable board (3A) is interlocked to the lever (2) by disposing the engager (23) within the elongate hole (32A) and engaging the engager (23) with a wall surface (34A) of the elongate hole (32A); and wherein the wall surface (34A) of the elongate hole (32A) has an inclination angle (θ) which varies along a length of the elongate hole (32A) depending on a distance from the third axis (31A), said inclination angle (θ) decreasing as the third axis (31A) is approached and being an acute angle at a closest position to the third axis (31A) and an obtuse angle at a farthest position from the third axis (31A).

* * * * *